L. C. LAURENT.
FUME CONDENSING APPARATUS.
APPLICATION FILED AUG. 9, 1907.

907,379.

Patented Dec. 22, 1908.

Witnesses
Otto E. Hoddick.
Ebert O'Brien.

Inventor
Louis C. Laurent.
By
Attorney

UNITED STATES PATENT OFFICE.

LOUIS C. LAURENT, OF DENVER, COLORADO.

FUME-CONDENSING APPARATUS.

No. 907,379.　　　Specification of Letters Patent.　　　Patented Dec. 22, 1908.

Application filed August 9, 1907. Serial No. 387,929.

*To all whom it may concern:*

Be it known that I, LOUIS C. LAURENT, a citizen of the United States, residing in the city and county of Denver and State of Colorado, have invented certain new and useful Improvements in Fume-Condensing Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in apparatus for the condensation of furnace fumes. It is adapted for use wherever the treatment of the ores results in the volatilization of certain elements contained in the ore as sulfur, arsenic and other elements which when present render the ores refractory or incapable of successful and economical treatment for the saving of their metallic values. Wherever impurities as sulfur and arsenic are contained in the ores to any considerable degree, their volatilization and escape in the form of fumes from roasting or smelting furnaces, not only vitiates the atmosphere of the surrounding territory for a distance of several miles, but also destroys vegetation in the vicinity. This difficulty in some sections of the country exists to such a remarkable degree, that the owners of land in the vicinity of the smelters have been obliged, as a matter of self protection, to bring suits for damages for the destruction of their crops.

The object of my present invention is to overcome this difficulty, by condensing the fumes from furnaces of the aforesaid character, whereby the impurities are prevented from escaping from the smoke stack. Some of these condensed impurities as sulfur which produces sulfuric acid, may be utilized as commercial products.

Briefly stated my improved construction consists of an interposed inclined conduit between the furnace and the stack and means for introducing sprays of water into the conduit at suitable intervals whereby these sprays are located in the path of the travel of the fumes, with the result, that all condensable products are precipitated in the conduit which is provided at its bottom with a runway having outlets at suitable intervals whereby the condensed products may be drawn off and conducted to any desired location.

Having briefly outlined my improved construction, I will proceed to describe the same in detail reference being made to the accompanying drawing in which is illustrated an embodiment thereof.

Figure 1:
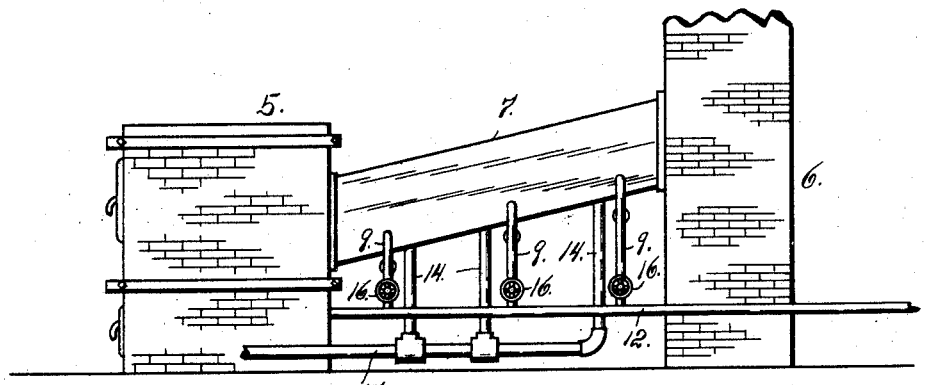
Figure 2:
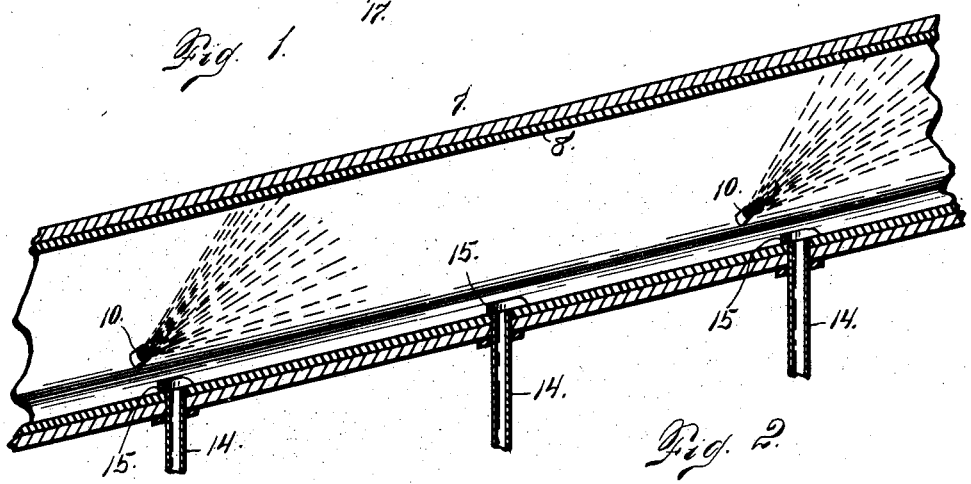
Figure 3:
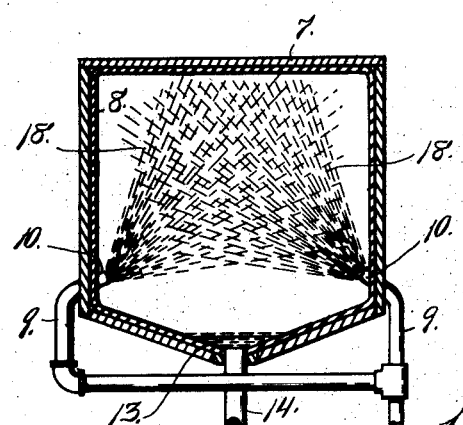

In this drawing, Figure 1 is an elevation of a furnace and stack equipped with my improved condensing apparatus. Fig. 2 is a vertical longitudinal section taken through the condensing conduit, the parts being shown on a larger scale. Fig. 3 is a cross section taken through the conduit on a still larger scale.

The same reference characters indicate the same parts in all the views.

Let the numeral 5 designate a furnace; 6 the stack; and 7 an intermediate flue connecting the furnace with the stack and through which the fumes from the furnace pass to the stack. This flue or conduit is somewhat inclined and should be provided with a lead lining 8, to prevent the acid formed by the condensation of the fumes, from attacking the wood or other material of which the condensing flue is constructed. This flue is equipped on opposite sides with pipes 9 which pass through the walls of the flue and terminate in spray nozzles 10 which protrude into the flue. These spray pipes are connected with a supply pipe 12 through which water is passed under pressure to the branch pipes 9, and thence to the nozzles 10 which form it into a finely divided spray, the same being discharged into the conduit or flue. The spray pipes preferably enter the flue from opposite sides and are preferably located near its lower part. These spray nozzles may be arranged at any suitable intervals that may be found necessary for thoroughly condensing the fumes passing through the flue. For convenience the bottom or lower wall of the flue is inclined downwardly toward the center forming a sort of runway for the liquid 13. Communicating with this runway and arranged at suitable intervals, are discharge pipes 14 for getting rid of the condensed fumes. A flange 15 is located adjacent the upper extremity of each pipe 14, within the condensing flue. These flanges pass below the upper extremity of the pipe 14 but not above the same, whereby the liquid running down the flue is unobstructed above the pipes 14 but slightly dammed or interrupted below these pipes to facilitate the discharge of the condensed material.

The spray pipes 9 are equipped with valves 16 for controlling the discharge of liquid therethrough.

The outlet pipes 14, communicate with a main pipe 17 for carrying off the condensed products.

From the foregoing description the use and operation of my improved apparatus will be readily understood. When the furnace is in use, the fumes are continually passing through the flue or conduit 7. Simultaneously with the starting of the furnace, sprays 18 of liquid, as water, are introduced into the condensing flue from opposite sides thereof, the said sprays lying in the path of the fumes as they pass from the furnace to the stack. The sprays of liquid are delivered to the condensing flue at such intervals, as to thoroughly condense all combustible products. These condensed products naturally seek the bottom of the flue and are drawn off through the pipes 14 at suitable intervals.

Having thus described my invention, what I claim is:

1. In condensing apparatus, the combination with a furnace and stack, of a flue connecting the furnace with the stack and through which the furnace fumes pass, the said flue being downwardly inclined from the stack to the furnace, and means for introducing liquid sprays into the flue at suitable intervals, the said sprays being directed toward the stack, whereby the draft of the furnace is not retarded.

2. The combination with a stack and furnace, of a lead-lined flue connecting the stack and furnace and downwardly inclined from the former to the latter, the flue being equipped with means for delivering liquid sprays thereinto the said sprays being directed towards the stack, substantially as described.

3. The combination with a stack and furnace, of a flue forming a direct connection between the stack and furnace and downwardly inclined from the stack to the furnace, and suitable means located at intervals for drawing off the condensed products from the flue, substantially as described.

4. The combination with a furnace and stack, of a flue connecting the said structures and downwardly inclined from the stack to the furnace, the bottom of the flue being provided with a runway, means for introducing liquid sprays to the flue, and means located at intervals for drawing off the condensed products at the bottom of the flue, substantially as described.

In testimony whereof I affix my signature in presence of two witnesses.

LOUIS C. LAURENT.

Witnesses:
DENA NELSON,
MAY GAWLEY.